(12) United States Patent
Ritchie et al.

(10) Patent No.: US 7,434,677 B2
(45) Date of Patent: Oct. 14, 2008

(54) APPARATUS FOR ALIGNING MEAT PRODUCTS

(75) Inventors: Glenn Ritchie, Caistor (GB); Neil Stone, Pinner (GB)

(73) Assignee: Blackrow Engineering Company Ltd., Grimbsby (GB)

( * ) Notice: Subject to any disclaimer, the term of this patent is extended or adjusted under 35 U.S.C. 154(b) by 651 days.

(21) Appl. No.: 11/057,431

(22) Filed: Feb. 14, 2005

(65) Prior Publication Data

US 2006/0180032 A1    Aug. 17, 2006

(51) Int. Cl.
*B65G 47/24* (2006.01)
(52) U.S. Cl. .................................. 198/407; 198/406
(58) Field of Classification Search ............. 198/406, 198/407, 312, 579, 584
See application file for complete search history.

(56) References Cited

U.S. PATENT DOCUMENTS

| | | | | | |
|---|---|---|---|---|---|
| 2,591,971 | A | * | 4/1952 | Skillman | 198/599 |
| 2,878,776 | A | * | 3/1959 | Vogel | 198/603 |
| 3,478,704 | A | * | 11/1969 | Ford | 198/403 |
| 4,130,048 | A | * | 12/1978 | Lewallyn | 409/158 |
| 4,751,876 | A | * | 6/1988 | Escamilla | 198/406 |
| 4,899,869 | A | * | 2/1990 | Johnson | 198/318 |
| 4,958,409 | A | | 9/1990 | Braeger et al. | |
| 5,979,303 | A | * | 11/1999 | Kobayashi et al. | 99/403 |

FOREIGN PATENT DOCUMENTS

| | | |
|---|---|---|
| DE | 14 54 072 A | 10/1969 |
| WO | WO 98/46086 A | 10/1998 |

OTHER PUBLICATIONS

European Patent Office, European Search Report for application No. EP 04 25 3259, dated Sep. 8, 2004, 3 pgs.

\* cited by examiner

*Primary Examiner*—James R Bidwell
(74) *Attorney, Agent, or Firm*—Vern Maine & Associates

(57) ABSTRACT

Apparatus for aligning meat products comprises an input conveyor for carrying the products into the apparatus, an output conveyor located beneath the input conveyor for carrying the products out of the apparatus, and at least one intermediate conveyor located between the input and output conveyors. All the conveyors are spaced vertically one above another and arranged such that products drop off the end of each conveyor in turn and on to the next conveyor below. Each successive conveyor travels in a different direction from the preceding conveyor whereby the products undergo a change in direction at each drop between the input and output conveyors, thereby being progressively aligned in the direction of travel of the conveyors.

17 Claims, 2 Drawing Sheets

US 7,434,677 B2

APPARATUS FOR ALIGNING MEAT PRODUCTS

FIELD OF THE INVENTION

This invention relates to food processing, and in particular to apparatus for aligning meat products for further processing.

BACKGROUND OF THE INVENTION

In the food industry, during production of a cooked or flash fried meat or fish product, pieces of raw meat (such as poultry) or raw fish are passed along a production line. In some cases, the raw meat or fish may be coated, for example with batter and/or breadcrumbs. The production line typically comprises conveyor belts that transport the raw meat or fish through different processing zones. The pieces of raw meat or fish are delivered across the width of the conveyor belt, typically by manual effort or vibrating spreader. Typically, the raw meat or fish ultimately is frozen or is delivered to a cooker or fryer. In this regard, this freezing or heating phase will "set" the product in the shape in which it is presented. As such, for product aesthetics, it is desirable that the pieces of raw meat or fish should be delivered in an aligned configuration. Furthermore, where the raw meat or fish is to be coated, it is important that the entire surface of the meat or fish is coated and, as such, that the meat or fish should be presented for coating in an "unravelled" and substantially flat configuration.

In view of the above, considering the pieces of raw meat or fish to generally be longer than they are wide, the pieces should lay on the conveyor belt with their "long" side substantially parallel to the direction of travel. Further, the pieces should lie substantially flat on the conveyor belt.

This operation has typically been carried out manually, with a team of people working alongside the conveyor to place the products in the correct alignment as they pass by. The work is boring and repetitive and, being labour-intensive, costly.

More recently, this manual alignment has been combined with vibrating conveyor belts. Examples of vibrating conveyor belts are the Iso-Flo® Batter/Breader Feed Systems and the Iso-Flo® Alignment Vibratory Conveyor, both made by Key Technology Inc, and the Product Orientators made by FMC Technologies Inc. In practice, generally, these vibrating conveyor belts are used in combination with manual alignment.

It has been found that these vibrating conveyor belts are particularly aggressive. As such, when transporting a coated material for example, the vibrating conveyor belt can cause the coating to come away from the material or to flatten on the material. This has clear disadvantages relating to the quality of the finished product.

In addition, it has been found that vibrating conveyor belts are difficult to integrate into an existing production line. This is because eventually the material must be transferred from the vibrating conveyor belt back onto a non-vibrating conveyor belt. It has been found that the material has a tendency to bunch up again at the point of transfer, thus counteracting the earlier aligning of the material.

To some extent, the industry has accepted the above problems. Further, any efforts to improve this have been concentrated on improving previously known vibrating conveyor belts by trying to optimize the frequency and intensity of vibration.

There have been proposals for apparatus to turn over and re-orient fish fillets. In DE-A-1454072, a machine is disclosed in which a fillet is carried by an upper conveyor and then passed downwards on to another conveyor which reverses its direction of movement to receive the fillet before resuming its normal motion to deliver the fillet in the same direction as the upper conveyor. A modified version of this is disclosed in U.S. Pat. No. 4,958,409. It comprises three conveyors, all running in the same direction, the upper conveyor dropping the fillet towards the start of an intermediate conveyor, which then delivers the fillet on to a third conveyor immediately beneath the intermediate conveyor. There is therefore still only one drop, with no reversal of direction to assist in aligning the fillet, and consistent alignment is unlikely to be achieved.

In view of the above, although it generally is understood that there is a problem in the food industry in aligning materials such as raw meat or fish on a production line, this substantially has been accepted as a problem that could not be substantially reduced or overcome.

In this regard, the present inventors unexpectedly have found a completely new approach for solving the above problem.

SUMMARY OF THE INVENTION

The present invention provides apparatus for aligning meat products, the apparatus comprising an input conveyor for carrying the products into the apparatus, an output conveyor located beneath the input conveyor for carrying the products out of the apparatus, and at least one intermediate conveyor located between the input and output conveyors, all the conveyors being spaced vertically one above another and arranged such that products drop off the end of each conveyor in turn and on to the next conveyor below, each successive conveyor travelling in a different direction from the preceding conveyor whereby the products undergo a change in direction at each drop between the input and output conveyors, thereby being progressively aligned in the direction of travel of the conveyors.

It will be understood that reference herein to "meat products" includes fish and other products having similar characteristics, namely irregular and non-uniform shape, and a non-rigid, typically floppy, structure, and the invention is concerned with the processing of all such products. It is particularly applicable to raw or uncooked meat products. The present invention has been found to be particularly effective when the product is raw meat or fish, particularly raw poultry. However, it readily will be appreciated that this process in fact is suitable for any flexible material that is required to be presented in a regular manner in a production line. This could be for example for the presentation of the material to a packing machine. In this regard, the flexible material may be any processed or fresh flexible food product, such as vegetables (whole or sliced for example), cheese products and bakery products.

Although not essential, one embodiment of the present invention provides that the drop between the first (top) conveyor belt and the second conveyor belt is larger than the drop between any of the other conveyor belts. This larger drop means that the material hits the second conveyor belt with a greater force. It has been found that this greater force causes the material to bounce. At this first stage in the process, this is advantageous in helping to separate and unravel the material. In this regard, the distance between the first (top) conveyor belt and the second conveyor belt advantageously may be larger than the length of the product. The length of the unravelled product is advantageously is in the range of from 50 mm to 250 mm. Therefore, the distance between the first (top) conveyor belt and the second conveyor belt advantageously may be in the range of from greater than 50 mm to greater than 250 mm.

Typical distances between the first and second conveyor belt will be up to 1½ times the unravelled length of the products. Preferably, the distance will be in the range from 1 to 1½ times the unravelled length of the products. In other words, preferable distances will be in the range from 50 mm to 375 mm. Where the unravelled length of the products varies within a range, it is sufficient for this distance to be measured in relation to any one of the pieces of flexible material or in relation to the average length of the products.

Generally, the drop between subsequent conveyor belts should not be sufficiently large that the material is allowed to free-fall from one conveyor belt to another. In this regard, generally, the drop may be not more than the length of the product. Thus, the distance between subsequent conveyor belts is preferably in the range of less than 250 mm. Usually, each of the subsequent conveyor belts is equidistant.

While the conveyors may all run at the same speed, preferably the linear velocity of each successive conveyor is greater than that of the last.

Some or all of the conveyors may be horizontal, while in alternative embodiments each intermediate conveyor is arranged at an angle to the horizontal whereby the products are carried upwardly thereby. The angle may vary from one conveyor to the next, but will typically be of the order of 5° to 10°. It is preferably less than 30°, and more preferably less than 20°. The input and/or output conveyors may also be arranged at an angle to the horizontal whereby the products are carried upwardly thereby. The conveyors are preferably mounted in such a manner that the angle of the conveyor surface to the horizontal can be selectively varied.

Ideally, as many conveyor belts would be used as are needed to fully align the pieces of material. However, the number of conveyor belts must be balanced against possible damage to the material by prolonged sorting.

There are preferably three intermediate conveyors between the input and output conveyors, although more or fewer may be employed. The conveyors are suitably aligned vertically whereby the products undergo a substantial reverse in direction at each drop.

The conveyors are preferably belt conveyors, the belts being most suitably of the type formed from wire or plastics mesh to facilitate cleaning and to assist in preventing the products from losing their alignment through slipping. The conveyors, or groups of the conveyors, may be driven by a common drive means, for example a chain engaging a drive sprocket on each belt, the chain being driven by a motor.

The conveyors may be mounted in such a manner that the height of the drop from one conveyor to the next may be selectively varied. This may be achieved by rotation of the conveyors or by mounting them in the support frame in such a manner as to be vertically slidable or otherwise adjustable.

In one embodiment a number of forces are imparted on the product in order to "unravel" it. As the material is flexible, and often irregular, these occur in complex combinations.

Gravity is used to extend the leading edge of the flexible material by its downward force and to give a change in direction and subsequent acceleration. At the point where the product is subjected to the force of gravity combined with the linear velocity from the conveyor, there is a turning moment. The trailing edge of the product tends to rotate around the leading edge. The material "unravels" as the inertia of the trailing edge attempts to carry it tangential to the rotation of the material. With a fall of distance not significantly greater than the length of the product (preferably less than the length of the product), one may select conveyor speeds that suitably balance the effect of gravity so that the unravelling effect can be sustained and subsequently maximized by counter conveyors (preferably angled past the horizontal).

At the point where the leading edge touches the conveyor belt on to which it is falling, where this conveyor belt is travelling in the opposite direction to the conveyor belt above, there is additional acceleration with greater centripetal force affecting the material. The inertia of the trailing edge is increased when accelerated by the force of gravity. Hence, the inertia of the trailing edge is increased when the conveyor is angled above the horizontal. The speeds and the drops between subsequent conveyor belts may be optimized to ensure that the extension of the leading edge by gravity is not to the detriment of the inertia from the velocity and its subsequent straightening effect.

In this regard, preferably, the velocity at which the conveyor belts are travelling is in the range 0.1 to 0.5 m/s. Further, the speeds of the conveyor belts may be subsequently quicker so that the conveyor belt on to which the flexible material is falling has a greater linear velocity than the conveyor belt from which it has dropped.

In one embodiment, the extent of overlap of subsequent conveyor belts is substantial, such as in the range greater than the product length. In other words, desirably the extent of overlap of subsequent conveyor belts is in the range of from greater than 50 mm to greater than 250 mm.

When the conveyor belts are arranged so that the conveyor belts have a substantial overlap and are located one partially underneath another, the overlap distance may be at least as great as the length of the conveyor belt that is located underneath the conveyor belt above.

With regard to the length of each conveyor belt, this is not particularly limited. However, it is of course necessary for each conveyor belt to be long enough so that material falling from the conveyor belt above does not fall off the back of the conveyor belt onto which it is falling. The length may be optimized for a particular flexible material or product. However, it is thought that conveyor belts (other than the top and bottom) having a short length in the range of from 3 to 6 times the length of the pieces of flexible material will generally be desirable. Therefore, it is thought that conveyor belts having a length in the range of from 150 mm to 1500 mm will be generally desirable.

There are no problems in incorporating the present apparatus into a processing line because the bottom conveyor belt in the plurality of conveyor belts simply can be the continuing production line. As such, the present apparatus may comprise a delivery conveyor belt (the top conveyor belt) and a removal conveyor belt (the bottom conveyor belt) in the plurality of conveyor belts. These conveyor belts typically will be responsible for connecting the aligning apparatus to the remainder of the production line and so their length predominantly will be dependent on height of adjoining equipment.

The width of the conveyor belt is not of particular relevance, provided that it is desirable for it to match the rest of the line.

The apparatus of the invention achieves a consistently high level of accurately aligned products, and it has been found that damage to the products is less than with manual handling. In addition, the apparatus can be used with coated products and is less likely to result in removal of the coating than manual aligning.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTIONS

Figure 1:
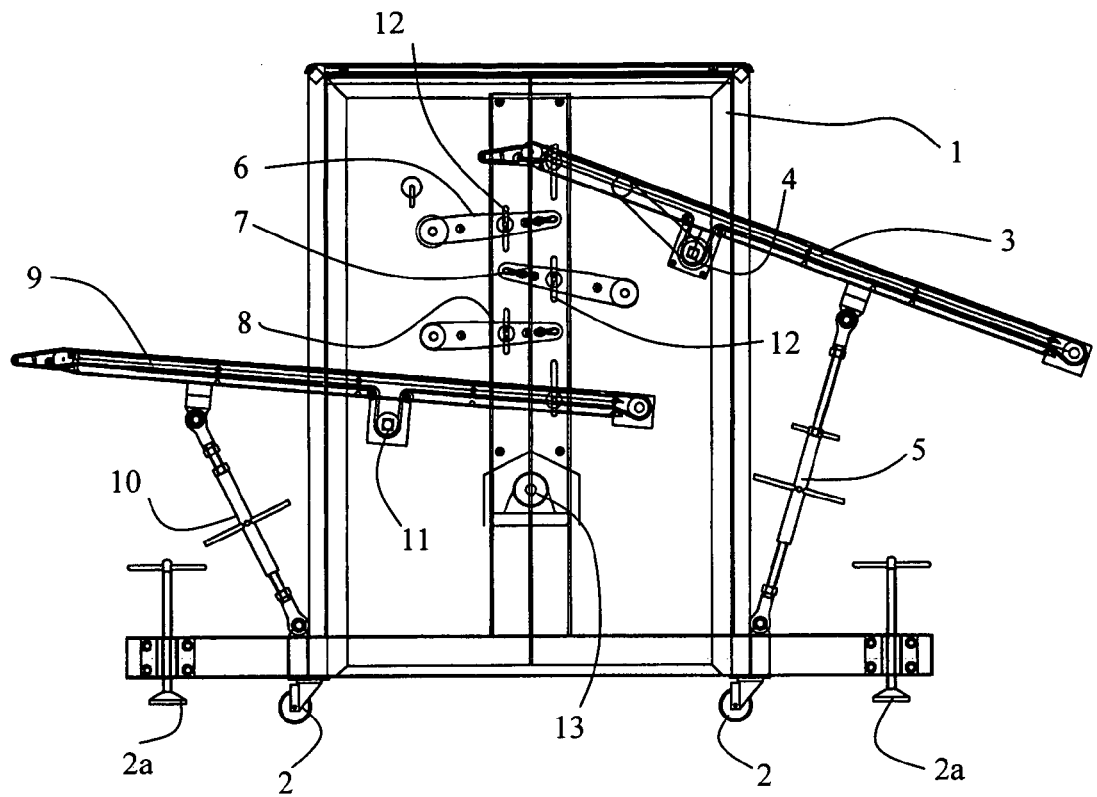
FIG. 1 is a side elevation of an apparatus configured according to one embodiment of the present invention.
Figure 2:
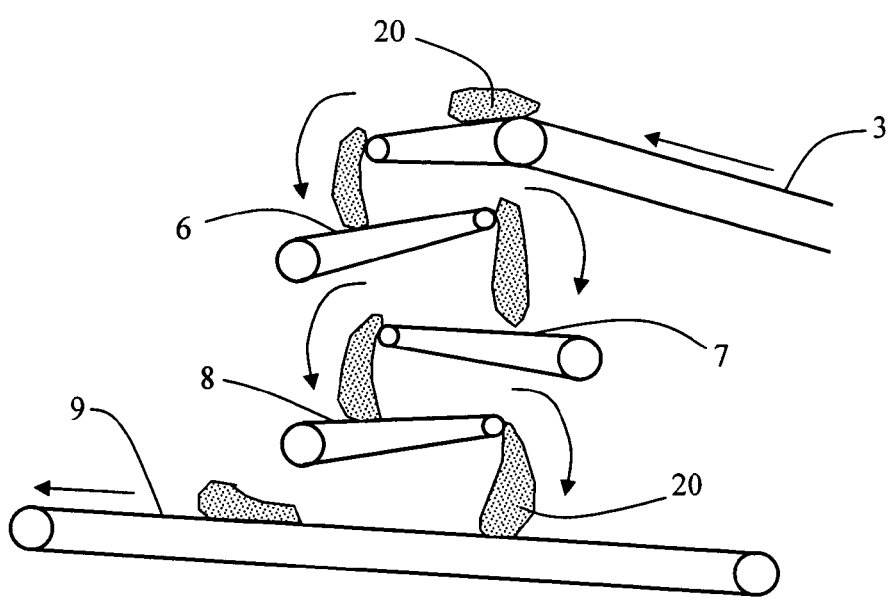
FIG. 2 is a diagrammatic view of the main elements of the apparatus shown in FIG. 1.

One embodiment of the present invention, illustrated in FIGS. 1 and 2 comprises a supporting frame 1 which may be conveniently mounted on castors 2 permitting the apparatus to be moved to become part of any production line, where feet 2a can be screwed down to support the frame and prevent unwanted movement. An input conveyor 3 carries the meat products into the apparatus, for example from a spreading chute (not shown). The input conveyor 3 comprises a wire mesh belt driven by an electric motor 4, the whole conveyor being hingedly mounted on the upper part of the supporting frame 1 and supported at its other end by a screw jack 5 mounted on the lower part of the frame 1, the jack 5 serving to control the receiving position of the lower part of the conveyor.

Mounted on the frame 1 vertically below the end of the input conveyor 3 is a series of three intermediate conveyors 6, 7 and 8, vertically spaced one from another. Each conveyor comprises a wire mesh belt, and the uppermost conveyor 6 is arranged with its conveying direction opposite to that of the input conveyor 3, while each successive intermediate conveyor 7 and 8 below it operates to convey in the opposite direction from the preceding conveyor above it. An output conveyor 9 is mounted on the frame 1 vertically below the final intermediate conveyor 8 and again runs in the opposite direction to the conveyor 8, so as to convey the aligned products out of the apparatus and on to the next processing stage. The output conveyor 9 is mounted in a similar manner to the input conveyor 3, being pivotally mounted on the frame 1 at one end thereof and carried by a screw jack 10 towards the other end thereof so as to permit adjustment of the discharge position of the output conveyor. The output conveyor 9 is also provided with its own drive motor 11, running independently of the speed of the apparatus.

Each of the intermediate conveyors 6, 7 and 8 is arranged with its conveying direction at an acute angle, for example 5° to 10°, to the horizontal such that the products falling onto it from the preceding conveyor are conveyed generally upwardly before dropping off the end of the conveyor and onto the next conveyor below. The intermediate conveyors are mounted in the frame 1 in such a manner as to be vertically adjustable in position, whereby the vertical spacing between the conveyors may be set according to the products being aligned, and the angle of the conveyor to the horizontal may also be varied. This may be achieved by using a lockable pivot mounted in a vertical slot 12. The angles may be adjusted by means of servo motors between the frame 1 and the intermediate conveyors, permitting adjustment to accommodate different products to be carried out semi-automatically in accordance with predetermined settings.

The intermediate conveyors 6, 7 and 8 may be individually driven by a respective electric motor, but are suitably powered by a common drive motor 13 through an endless drive chain (not shown). Each successive conveyor in the downward path of the products is driven with a linear speed slightly greater than the preceding conveyor. The combination of the reverse in direction as the product falls from one conveyor to the next, coupled with the slight increase in speed serves to call the products progressively into an orientation where the lengthwise axis of the product is substantially parallel to the longitudinal axis of the conveyors.

The vertical spacing between the conveyors is suitably selected so that one end of the product reaches the next conveyor below as the other end leaves contact with the first conveyor. Typically, the belt speeds will be of the order of 10 to 12 meters per minute. Where the intermediate conveyors are chained driven from common drive motor, the differential speeds may be achieved by the use of different-sized sprockets for the different conveyors. The difference of 1 to 2 teeth from one sprocket to another will generally be sufficient to provide the desired acceleration of the product as it dropped onto the conveyor to assist alignment of the product.

It will be understood that, while reference is made to the use of electric motors to drive the conveyors, other types of drive motor, for example hydraulic or pneumatic, might be employed in some circumstances.

As may be seen from FIG. 2, at each successive drop from one conveyor to the next, the reversal in direction and the increase in speed tends to flip the product 20 over, while the heavier end tends to fall first and so be influenced first by the next conveyor, pulling the heavier end upwardly while the lighter end follows on. Repetition of this process pulls the product progressively more into alignment with the direction of travel of the conveyors until the output conveyor is reached and the products are correctly aligned for the next stage, for example a dip enrober to coat the product with, for example, batter, or a deep fat fryer through which the conveyor belt is caused to pass. By correctly aligning the products before processing, the risk of imperfect coating or cooking, as the case may be, is avoided. A food processing line may therefore include more than one apparatus in accordance with the invention for aligning the products prior to different stages.

EXAMPLE

Figure 3:
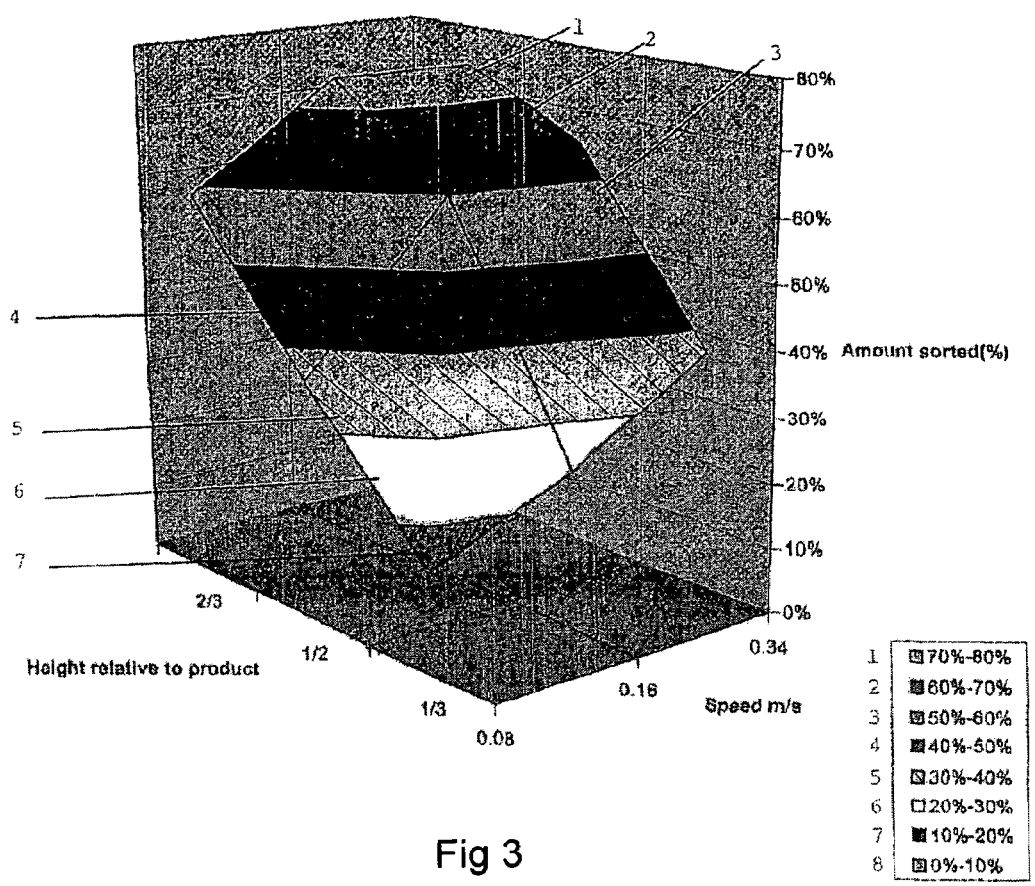
FIG. 3 shows a graph of performance of one embodiment of the apparatus according to the present invention at varying conveyor speeds and heights.

Performance of apparatus according to the present invention was assessed and the results are shown in FIG. 3.

The tested apparatus included five conveyors. The speed referred to in FIG. 3 is the speed of the discharge conveyor belt. In all tests the discharge conveyor speed was about 50% higher than the speed of the first conveyor belt. Increases in speed of subsequent conveyor belts were uniform. All of the conveyors were positioned horizontally. The conveyor belts were positioned equidistant from each other. The "height relative to product" shown in FIG. 3 refers to the distance between subsequent conveyor belts being either ⅔, ½ or ⅓ of the average unravelled product length. The pieces of flexible material each had a weight in the range of from 25 to 35 grams.

On average, the pieces of flexible material were 110 mm long.

Further tests were carried out using the same apparatus at the three different speeds and with the "height relative to product" being ⅔ of the average unravelled product length. The three central conveyor belts were positioned at the largest allowable angle above the horizontal. These results showed a maximum improved performance shift of about 10-15%, thus giving an about 90% sorted product.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An apparatus for aligning meat products, comprising:
   an input conveyor for carrying the products into the apparatus;
   an output conveyor located beneath the input conveyor for carrying the products out of the apparatus;
   at least one intermediate conveyor located between the input and output conveyors, all the conveyors being spaced vertically one above another and arranged such that products drop off the end of each conveyor in turn and on to the next conveyor below, each successive conveyor traveling in a different direction from the preceding conveyor whereby the products undergo a change in direction at each drop between the input and output conveyors, thereby being progressively aligned in the direction of travel of the conveyors; and
   wherein the linear velocity of each successive conveyor is greater than that of the last.

2. The apparatus according to claim 1, wherein said at least one intermediate conveyor is arranged at an angle to the horizontal whereby the products are carried upwardly thereby.

3. The apparatus according to claim 1, wherein the input conveyor is arranged at an angle to the horizontal whereby the products are carried upwardly thereby.

4. The apparatus according to claim 1, wherein the output conveyor is arranged at an angle to the horizontal whereby the products are carried upwardly thereby.

5. The apparatus according to claim 2, wherein said at least one conveyor is mounted such that the angle of the conveyor surface to the horizontal can be selectively varied.

6. The apparatus according to claim 3, wherein the input conveyor is mounted such that the angle of the conveyor surface to the horizontal can be selectively varied.

7. The apparatus according to claim 4, wherein the output conveyor is mounted such that the angle of the conveyor surface to the horizontal can be selectively varied.

8. The apparatus according to claim 1, comprising three intermediate conveyors between the input and output conveyors.

9. The apparatus according to claim 1, wherein the conveyors are aligned vertically whereby the products undergo a substantial reverse in direction at each drop.

10. The apparatus according to claim 1, wherein the conveyors are belt conveyors.

11. The apparatus according to claim 10, wherein the belt conveyors are wire mesh belt conveyors.

12. The apparatus according to claim 10, wherein the belt conveyors are all driven by a common drive means.

13. The apparatus according to claim 12, wherein the common drive means comprises a chain engaging a drive sprocket on each belt, the chain being driven by a motor.

14. The apparatus according to claim 13, wherein the motor is an electric motor.

15. The apparatus according to claim 13, wherein the sprockets have differing numbers of teeth whereby the belts are driven at differing speeds one from another.

16. An apparatus for aligning meat products, comprising:
    an input conveyor for carrying the products into the apparatus;
    an output conveyor located beneath the input conveyor for carrying the products out of the apparatus;
    at least one intermediate conveyor located between the input and output conveyors, all the conveyors being spaced vertically one above another and arranged such that products drop off the end of each conveyor in turn and on to the next conveyor below, each successive conveyor traveling in a different direction from the preceding conveyor whereby the products undergo a change in direction at each drop between the input and output conveyors, thereby being progressively aligned in the direction of travel of the conveyors, wherein the conveyors are mounted in such a manner that the height of the drop from one conveyor to the next may be selectively varied.

17. The apparatus according to claim 16, wherein the conveyors are mounted in a support frame so as to be vertically slidable.

* * * * *